United States Patent [19]
Kitagawa

[11] Patent Number: 5,748,372
[45] Date of Patent: May 5, 1998

[54] HIGH NUMERICAL APERTURE AND LONG WORKING DISTANCE OBJECTIVE SYSTEM USING DIFFRACTION-TYPE OPTICAL ELEMENTS

[75] Inventor: Junichi Kitagawa, Hachioji, Japan

[73] Assignee: Olympus Optical Company Limited, Tokyo, Japan

[21] Appl. No.: 633,529

[22] Filed: Apr. 17, 1996

[30] Foreign Application Priority Data

Apr. 17, 1995 [JP] Japan ................ 7-090908

[51] Int. Cl.[6] ............... G02B 5/18; G02B 3/08; G02B 21/02
[52] U.S. Cl. ............... 359/565; 359/571; 359/656
[58] Field of Search ............... 359/565, 571, 359/16, 19, 741, 742, 656

[56] References Cited

U.S. PATENT DOCUMENTS

| | | | |
|---|---|---|---|
| 5,013,133 | 5/1991 | Buralli et al. | 359/565 |
| 5,148,314 | 9/1992 | Chen | 359/565 |
| 5,151,823 | 9/1992 | Chen | 359/742 |
| 5,170,207 | 12/1992 | Tezuka et al. | 359/742 |
| 5,257,133 | 10/1993 | Chen | 359/565 |
| 5,268,790 | 12/1993 | Chen | 359/742 |
| 5,287,218 | 2/1994 | Chen | 359/565 |
| 5,371,570 | 12/1994 | Morris et al. | 359/565 |
| 5,436,763 | 7/1995 | Chen et al. | 359/565 |
| 5,444,569 | 8/1995 | Broome | 359/362 |
| 5,446,588 | 8/1995 | Missig et al. | 359/566 |
| 5,493,441 | 2/1996 | Chipper | 359/565 |
| 5,526,183 | 6/1996 | Chen | 359/629 |
| 5,543,966 | 8/1996 | Meyers | 359/565 |
| 5,555,479 | 9/1996 | Nakagiri | 359/565 |

FOREIGN PATENT DOCUMENTS

| | | | |
|---|---|---|---|
| 2850574 | 6/1979 | Germany | 359/19 |
| 2-1109 | 1/1990 | Japan . | |
| 6-194605 | 7/1994 | Japan | 359/19 |
| 6-331898 | 12/1994 | Japan . | |
| 6-347700 | 12/1994 | Japan . | |
| 1053055 | 11/1983 | U.S.S.R. | 359/19 |
| 1151905A | 4/1985 | U.S.S.R. | 359/19 |

*Primary Examiner*—Jon W. Henry
*Attorney, Agent, or Firm*—Cushman, Darby & Cushman IP Group of Pillsbury Madison & Sutro LLP

[57] ABSTRACT

The invention provides a high-magnification and high-NA objective having a long working distance, which is corrected for various aberrations, especially chromatic aberrations over a wide wavelength range and allowed to have an aligning pupil position without making much use of cemented lenses and anomalous dispersion glass. The objective comprises a first lens group G1 including a meniscus lens concave on the object side and having a positive power as a whole, two optical elements of the diffraction type (DOEs), and a second lens group G2 including at least one cemented lens, and satisfies the condition for ensuring the edge thickness of the front lens as well as either one of two conditions for making effective correction for longitudinal chromatic aberration and chromatic aberration of magnification.

15 Claims, 7 Drawing Sheets

HIGH NUMERICAL APERTURE AND LONG WORKING DISTANCE OBJECTIVE SYSTEM USING DIFFRACTION-TYPE OPTICAL ELEMENTS

BACKGROUND OF THE INVENTION

The present invention relates generally to an objective used with optical systems such as microscopes, and specifically to an objective used on metallurgical laser microscopes (MLSMs) which is well corrected for chromatic aberrations over a wide wavelength range for normal-type observations and also is well accommodated to three or more types of lasers. More particularly, this invention pertains to an objective having a long working distance, high magnification and high numerical aperture (NA).

For conventionally available objectives, such as ones having high NA, it has been required to use many lenses and anomalous dispersion glass so as to enable various aberrations, especially chromatic aberrations, to be well corrected. This has inevitably caused such objectives to cost much, and those having a long working distance to be unable to be designed using dioptric lenses alone.

In recent years, attention has been paid to optical systems using diffraction-type optical elements (DOEs). Objectives designed using such DOEs are currently available. Typical examples are disclosed in JP-A-63-77003, JP-A-63-155432, JP-A-59-33636, JP-A-60-247611, JP-A-2-1109, JP-A-4-361201, JP-A-6-331898, and JP-A-6-347700.

For publications dealing with DOEs making use of diffraction, for instance, refer to "Miniature Optical Elements for Optics Designers", Chapters 6 & 7, Optronics Co., Ltd., Japan, and William C. Sweatt, SPIE., Vol. 126, pp. 46–53 1977, "New Method of Designing Holographic Optical Element". These publications give a detailed account of the principles of DOEs. For a better understanding of the present invention, however, those principles will here be briefly set forth below.

Figure 1:
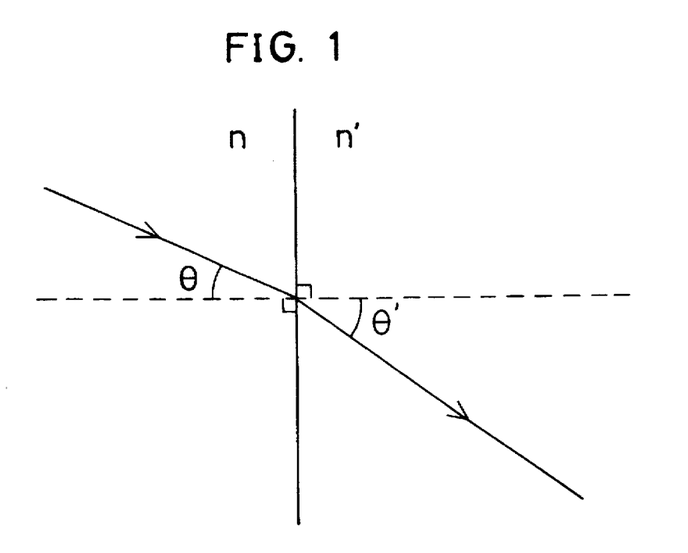
FIG. 1 is a view for illustrating how light is refracted according to Snell's law.

Upon incidence on ordinary optical glass, as shown in FIG. 1, a ray of light is refracted according to Snell's law, i.e., $$n \sin \theta = n' \sin \theta' \tag{1}$$

where n is the index of refraction of one medium which the ray strikes, n' is the index of refraction of the other medium which the ray leaves, θ is the angle of incidence of the ray, and θ is the angle of emergence of the ray.

Figure 2:
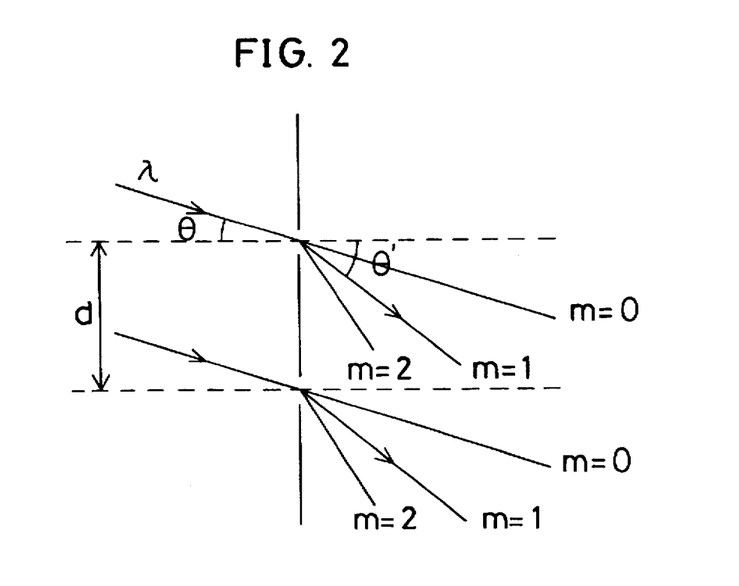
FIG. 2 is a view for illustrating how light is diffracted according to the law of diffraction.

In the process of diffraction, as shown in FIG. 2, on the other hand, a ray of light is bent according to the law of diffraction or Eq. (2) given below $$n \sin \theta - n' \sin \theta' = m\lambda/d \tag{2}$$

where m is the order of diffracted light, λ is the wavelength, and d is the grating separation.

Figure 3A:
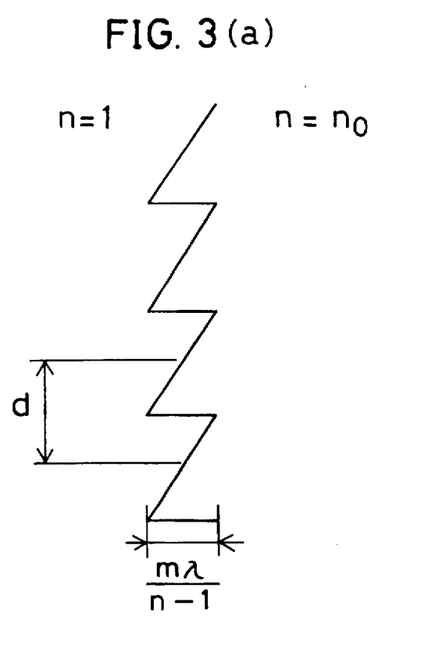
FIGS. 3(a) and 3(b) are sectional schematics of diffraction type of optical elements which have been blazed and subjected to binary approximation.
Figure 3B:
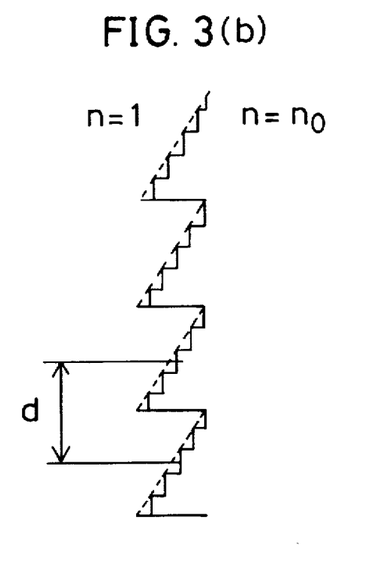

An optical element through which rays of light can be bent according to Eq. (2) is a diffraction type of optical element (DOE). While in FIG. 2 opaque and transparent portions are shown to be juxtaposed with separations d therebetween, it is understood that if a transparent member is provided on its surface with a diffraction surface of sawtooth shape in section for blazing as shown in FIG. 3(a) or if it is subjected to binary approximation as shown in FIG. 3(b), it is then possible to achieve high diffraction efficiency.

An account will now be given of some advantages obtained by use of such a DOE as mentioned above.

For a dioptric thin lens, the following equation (3) holds $$1/f = (n-1)(1/r_1 - 1/r_2) \tag{3}$$

where f is the focal length of the lens, $r_1$ and $r_2$ are the radii of curvature of the planes of incidence and emergence of the lens, respectively, and n is the index of refraction of the lens.

By differentiating both sides of Eq. (3) with respect to a wavelength λ, we obtain Eq. (4)

$$df/d\lambda = -f/(n-1) \cdot dn/d\lambda \Delta f = -f\{\Delta n/(n-1)\} \tag{4}$$

With the exception of the proportional constant effect, Δn/(n−1) represents dispersion, so that the dispersion value ν can be defined as $$\nu = (n-1)/\Delta n \tag{5}$$

Then, the dispersion value (Abbe's number $\nu_d$) in the visible region can be given by $$\nu_d = (n_d - 1)/(n_F - n_C) \tag{6}$$

For a DOE, on the other hand, Eq. (7) holds; if dh represents the grating separation at an incident parallel ray height h, then the focal length f of the DOE is given by $$f = h/(n' \sin \theta') = (dh \cdot h)/(m\lambda) \tag{7}$$

In the case of the DOE in the paraxial region, dh·h is so constant that by differentiating both sides of f=C/λ (where C is a constant) with respect to λ, we can obtain Eq. (8) as follows.

$$df/d\lambda = -C/\lambda^2 = -f/\lambda \Delta f = -f\Delta\lambda/\lambda \tag{8}$$

(n−1)Δn=ν, so that ν=λ/Δλ from Eqs. (4) and (8).

Then, the Abbe's number $\nu_d$ of the DOE in the visible region can be found as $$\nu_d = \lambda_d/(\lambda_F - \lambda_C) = -3.453 \tag{9}$$

Thus, the DOE has a very large negative dispersion. The fact that the dispersion of ordinary glass is about 20 to about 95 reveals that the DOE has a very large reciprocal dispersion. Similar calculation also indicates that the DOE has a large anomalous dispersion.

Of the above-mentioned publications, JP-A-63-77003, JP-A-63-155432, JP-A-59-33636 and JP-A-60-247611 are all directed to pickup lens systems for optical disks, which are characterized by comprising one or two optical elements of the diffraction type or one dioptric (lens) element and one optical element of the diffraction type, and using a monochromatic light source fundamentally.

Both JP-A-2-1109 and JP-A-4-361201 are directed to projection lens systems used on steppers, etc., which consist only of quartz but make no use of any cemented lens at all. In particularly, the former JP-A-2-1109 is characterized in that a diffraction type of optical system is disposed at the pupil position and the latter JP-A-4-361201 in that a higher order of diffracted light is used at a peripheral portion of a diffraction type of optical element than at a central portion thereof.

The lens systems set forth in JP-A-6-331898 and JP-A-6-347700 in particular are designed in the form of objectives for optical systems of microscopes, the former making use of a DOE and a cemented lens and the latter at least one DOE formed of a single vitreous material. The former system is characterized by enabling chromatic aberrations to be well corrected over a wide wavelength range, while the latter system has the characteristic feature in that chromatic aberrations can be corrected within a narrow wavelength region or for two wavelengths using the DOE, although it is formed of a single vitreous material.

Of these conventional examples, the pickup lens type makes no use of the ability of the diffraction type of optical element to correct chromatic aberrations, and so cannot be applied to microscope objectives of more sophisticated construction, and the stepper lens type may prima facie be applied to microscope objectives of low magnification but cannot to those of high magnification and high NA. This is because when a given objective is corrected for chromatic aberrations using a DOE alone, the power of the DOE must be increased and, hence, the minimum pitch of the DOE must be decreased to such an extent that it can no longer be fabricated. At the same time, it is difficult to correct in this type for chromatic aberrations over a considerably wide wavelength range (of about 50 nm for instance), because of being formed of quartz alone.

The objective lens type, if it is fabricated of a cemented lens, may be applicable to objectives of high magnification and high NA. However, no satisfactory results are achievable with a simple DOE and cemented lens combination alone, because as the working distance increases, various aberrations produced by the front lens group increase, resulting in the need of making a well-balanced correction for such aberrations or for chromatic aberrations over a wide wavelength range. With that of a single vitreous material, it is also difficult to correct various aberrations incidental to such a long working distance and correct chromatic aberrations over a wide wavelength range as in the case of the stepper type.

SUMMARY OF THE INVENTION

The present invention has been accomplished in view of the problems associated with such prior art. Accordingly, an object of the invention is to provide an objective system which has high magnification, high NA and long working distance, is well corrected for various aberrations, especially chromatic aberrations, over a wide wavelength range without making much use of cemented lenses or anomalous dispersion glass, and has an aligning exit pupil position.

According to the present invention, the above-mentioned purpose is achieved by the provision of an objective system characterized by comprising a first diffraction type of optical element having a diffraction action, a second diffraction type of optical element located farther off said first diffraction type of optical element and on the image side, and at least one cemented lens located between said first and second diffraction type of optical elements, said cemented lens having a cemented surface.

Preferably, the objective system of the present invention includes a meniscus lens concave on the object side, which is located off the first diffraction optical element and on the object side.

More preferably, the objective system of the present invention comprises a first group including a meniscus lens concave on the object side, said meniscus lens being located off the first diffraction optical element and on the object side, and having a positive power as a whole.

According to the present invention, there is provided another objective system characterized by comprising, in order from the object side, a first group including a meniscus lens concave on the object side and having a positive power as a whole, a first diffraction type of optical element having a diffraction action, and a second group divided into a front sub-group including at least one cemented lens having a cemented surface and a rear sub-group including at least one lens, with a second diffraction type of optical element located between said front and rear sub-groups.

According to the present invention, it is desired that at least one of the first and second diffraction type of optical elements be in the form of a transparent member having a diffraction surface of sawtooth shape in section, wherein each sawtooth is or is not stepped.

Furthermore, it is desired that any one of the following conditions (1), (2), (3) and (4) be satisfied $$0.5 < R/t < 5 \tag{1}$$

$$D_d/D > 0.8 \tag{2}$$

$$(h \cdot f)/(L \cdot I) > 0.07 \tag{3}$$

$$(W \cdot H)/(L \cdot f) > 0.005 \tag{4}$$

where R is the radius of curvature of said meniscus lens on the image side, t is the thickness of said meniscus lens, $D_d$ and D are the diameter of a bundle of marginal rays and the maximum diameter of a bundle of marginal rays on the diffraction type of optical element surface, respectively, f is the focal length of the objective system, h is the maximum principal ray height at the surface of the diffraction type of optical element, L is the parfocal length, I is the maximum image height at a given sample surface, W is the working distance, and H is the marginal ray height at said concave surface of said meniscus lens.

It is also desired that one of the first and second diffraction type of optical elements has a positive power while the other has a negative power. It is then desired to conform to condition (5) given below $$30 < f_d/f < 150 \tag{5}$$

where $f_d$ and f are the focal lengths of the objective system and said diffraction type of optical element having a positive power, respectively.

Further, it is desired that an Abbe's number difference between lenses adjacent to said at least one cemented lens conform to condition (6) given below $$\Delta \nu > 20 \tag{6}$$

Still further, it is desired that at least one positive surface and at least one negative surface be located off an actual pupil position of the objective and on the image side.

Still further, it is desired that the lens group of the objective system proximate to the image side consist of a cemented lens.

A detailed account will now be given of why the above-mentioned arrangements are used and how they work.

A conventional objective is corrected for chromatic aberrations using a cemented lens obtained by cementing together lens elements of vitreous materials varying in Abbe's number. The Abbe's number of ordinary vitreous materials has a positive value lying in the range of 20 to 95, whereas the Abbe's number of a DOE has a negative yet small absolute value, as already mentioned. Therefore, if an objective system is designed to include a cemented lens (formed of an ordinary glass lens) between two DOEs as mentioned above, it can then have some strong action on making correction for chromatic aberrations; so it is possible to realize a high-magnification and high-NA objective system having a long working distance, which has so far been difficult to design.

When a high-magnification and high-NA objective having a long working distance is designed to be corrected for chromatic aberrations using a diffraction type of optical element alone, the power of the DOE becomes too strong; so the minimum pitch of the DOE becomes too small. Given at least the above-mentioned lens design, however, both the cemented lens and DOEs are allowed to take share in correction of chromatic aberrations, so that the minimum pitch of the DOEs can be relatively large or the power of the DOEs can be diminished, and the ability to make correction for chromatic aberrations can be developed.

For an objective of high NA and high magnification, it is required that the front lens have a surface of strong power so as to convert divergent light leaving an object into convergent light. When a lens convex on the object plane is used, however, the amount of various aberrations occurring there is very large and so is undercorrected by the rear group. Thus, it is inevitably required to use a meniscus lens concave on the object plane. The meniscus lens used herein must be in a semi-circular form so as to ensure good-enough edge thickness, because the radius of curvature of the image-side surface of the meniscus lens must be decreased to increase the power thereof, as can be understood from the above-mentioned condition (1). When the lower limit of 0.5 is not reached, it is not only impossible to ensure the above-mentioned good-enough edge thickness, but also the amount of spherical aberration occurring at that surface becomes too large. When the upper limit of 5 is exceeded, on the other hand, it is impossible to obtain the required sufficient power, thus failing to obtain convergent light effectively.

The chromatic aberrations to be corrected are generally broken down into longitudinal chromatic aberration and chromatic aberration of magnification, the former being a focal position displacement with wavelength and the latter a focal length (magnification) variation with wavelength.

The most effective correction of longitudinal chromatic aberration is achievable at the pupil position of the objective. Although it is not always required that this position be exactly located at the pupil position, it is understood that a place which is located in the vicinity of the pupil position and at which the diameter of a (axial marginal) luminous flux is large is effective for correction of longitudinal chromatic aberration. Condition (2) is given to make this correction effectively. When the lower limit of 0.8 is not reached, longitudinal chromatic aberration introduced by another (dioptric) lens is undercorrected, resulting in the need of using many cemented lenses and anomalous dispersion glass or, in other words, the effect of the DOEs used becomes insufficient.

Chromatic aberration of magnification is effectively corrected at a location which is a little away from the pupil position of the objective and at which principal light rays have some height, rather than at that pupil position. Condition (3) is given to make this correction effectively. When the lower limit of 0.07 is not reached, chromatic aberration of magnification is undercorrected.

It follows that to make effective correction for chromatic aberrations, the DOEs should be located at places where condition (2) or (3) is satisfied, although depending on what they are used for. In this connection, it is noted that f, L and I in condition (3) are given for the purpose of normalization with f/I defining the parameter of the angle of principal rays and L the scaling parameter of the overall size. It is also noted that the parfocal length L is a distance from the turret nose of the objective to an object point, and is generally common to every ordinary objective, because changes of this distance result in the need of some considerable focusing alignment whenever magnification changes, and so make the ability of the objective to be manipulated worse.

The "turret nose" is here understood to define a surface of the microscope at which the revolver comes in contact with the objective.

Microscopes have now been increasingly required to have a longer working distance, partly because of recently developed methods for making some modifications to samples using microscopes and partly because of the need of observing samples fabricated by superfine processing. In one case samples are observed under microscopes while they are exposed to temperature changes or manipulated from the outside, and in another case finely processed samples such as those of semiconductor wafers or masks are observed under microscopes. In this regard, objectives are required to have some working distance primarily for the purpose of improving the ability of a sample to be (un)loaded or otherwise manipulated, and allowing for a sample space sufficient to protect a given sample against any possible damage. Even for a high-magnification and high-NA objective of high resolution, it is correspondingly required to have a working distance long-enough to ensure an allowable sample space. Although this may be achieved by making the objective size large, serious problems arise in connection with the weight of the objective, and the ability of the objective to be manipulated. To achieve an objective reduced in size but yet with a desired long working distance, condition (4) should here be satisfied. When the lower limit of 0.05 is not reached, it is not possible to secure the necessary working distance or to meet the above-mentioned demands because the value of NA becomes small. In condition (4), L is the scaling parameter for normalizing the entire size of the objective and W·H/f is the parameter concerning working distance, magnification and NA, so that working distances can be compared with each other irrespective of parfocal length.

Rays of light whose angle of divergence has been reduced by the above-mentioned meniscus lens concave on an object are further converged through several lenses, and then guided to the first DOE having a positive power upon marginal rays reaching a given height, where longitudinal chromatic aberration is primarily corrected. To make effective correction for various aberrations including chromatic aberrations, condition (5) should here be satisfied. With the lower limit of 30 not reached, the power of the first DOE does not only become too strong, resulting in overcorrection of longitudinal chromatic aberration, but the minimum pitch of the first DOE also becomes too small for its fabrication. With the upper limit of 150 exceeded, on the other hand, the power of the first DOE does not only become too weak, resulting in undercorrection of longitudinal chromatic aberration, but it is also impossible to effectively guide a bundle of rays in the converging direction. Upon passing through the first DOE, the rays from the object are guided through several lenses such as cemented lenses to the second DOE having a negative power. A DOE, because of being equivalent to a lens having an infinite index of refraction (as will be described later), produces some considerable astigmatism, although the Petzval sum is reduced to zero. It is thus desired to use a proper combination of DOEs having positive and negative powers, so that aberrations produced by the DOEs can be offset by the DOEs themselves.

Condition (6) is given so that DOEs and cemented lenses (effective for correction of chromatic aberrations) combined therewith in the objective can take proper share in correction of chromatic aberrations. With the lower limit of 20 not reached, the action of the cemented lenses on correction of chromatic aberrations becomes insufficient whereas the action of the DOEs on correction of chromatic aberrations becomes excessively large. As a result, it is impossible to fabricate such DOEs because their minimum pitch becomes too small.

Referring here to the metallurgical laser microscope (MLSM), it is important that the exit pupil positions of objectives of varying magnifications be in alignment. Varying magnifications inevitably lead to varying focal lengths or varying parfocal lengths, resulting in variation of actual pupil positions (where principal rays intersect the optical axis). To permit these pupil positions to be in alignment in the form of exit pupil positions of objectives, it is required that at least one positive surface and at least one negative surface be located off an actual pupil position of each objective and on the image side, thereby projecting the actual pupil position by the resulting power distribution.

When it is intended to make correction for the above-mentioned chromatic aberration of magnification with the use of the second DOE alone, which is located on the image side, similar problems as mentioned above arise. It is thus desired that the lens group of the objective proximate to the image side be composed of a cemented lens and used in combination with the second DOE, so that the chromatic aberration of magnification can be well corrected.

In high-grade objective lenses it is required to make color correction apochromatic, and so much anomalous dispersion glass must be used. However, this glass is expensive yet poor in processability, and so makes these objective lenses expensive. These problems, too, can be solved by making use of the anomalous dispersion of DOEs.

In view of fabrication, a DOE is also characterized in that diffraction grating separations can be set at one's disposal. The DOE is equivalent to any aspherical surface, and is higher in degrees of freedom of design than a conventional aspherical lens; for instance, it may have many points of inflection. The DOE can be fabricated with high precision as well. If the fact that an aspherical lens is unable to make correction for chromatic aberrations is taken into consideration, the DOE is said to be superior to the aspherical lens in terms of the ability to make correction for aberrations. A distributed index lens may make correction for chromatic aberrations, but encounters considerable limitations in view of fabrication.

By use of DOEs as in the present invention, therefore, it is possible to design and fabricate an objective which has such high performance as high magnification, high NA and long working distance and is well corrected for chromatic aberrations over an unheard-of wide wavelength range, and achieve noticeable cost reductions as well.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

Figure 4:
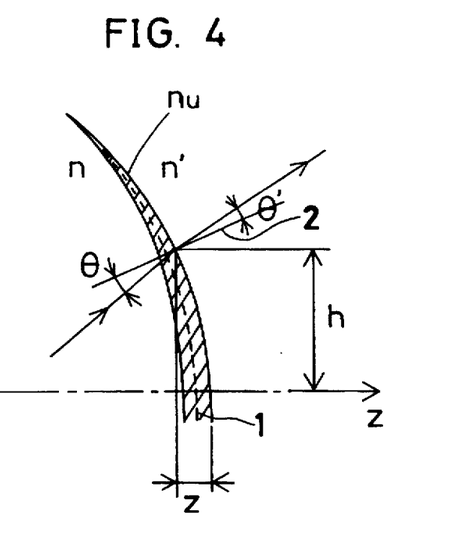
FIG. 4 is a schematic for illustrating a typical ultra-high index method.

The objective of the present invention will now be described more specifically with reference to some examples. First, the diffraction type of optical element used in the examples of the present invention is explained in further detail. Note that a diffraction type of optical element per se has already been explained in the Background of the Invention. Included in design methods for an optical system with such an optical element incorporated therein is one known as an ultrahigh index method, i.e., a design method wherein a diffraction type of optical element is replaced by a virtual lens (an ultrahigh index lens) having a very large index of refraction, as described in the above-mentioned William C. Sweatt, SPIE., Vol. 126, pp. 46–53 (1977). The ultrahigh index method will here be briefly described with reference to FIG. 4 wherein 1 represents an ultrahigh index lens and 2 stands for a normal line. Established for the ultrahigh index lens 1 is the relation given by $$(n_u - 1)\, dz/dh = n \sin \theta - n' \sin \theta' \qquad (10)$$

where $n_u$ is the refractive index of the ultrahigh index lens, z is the coordinate of the ultrahigh index lens along the optical axis direction, h is the distance from the optical axis, n and n' are the refractive indices of the media which light strikes and leaves, respectively, and $\theta$ and $\theta'$ are the angles of incidence and emergence of light, respectively. In the examples to be given later, $n_u$ is equal to 10001.

From Eqs. (2) and (10), $$(n_u - 1)\, dz/dh = m\lambda/d \qquad (11)$$

It follows that the equivalent relationship given by Eq. (11) is established between the surface shape of the ultrahigh index lens (a dioptric lens having a very large index of refraction) and the pitch of the diffraction type of optical element, so that the pitch of the diffraction type of optical element can be determined through this equation from data designed by the ultrahigh index method.

The axially symmetrical aspherical shape is generally represented by $$z = ch^2/[1 - c^2(k+1)h^2]^{1/2} + Ah^4 + Bh^6 + Ch^8 + Dh^{10} + \ldots \qquad (12)$$

where z is the optical axis (with the image direction regarded as being positive), h is the meriodinal coordinate axis of coordinate axes perpendicular to the z axis with the origin defined by the point of intersection of a given surface with respect to the z axis, c is the curvature of a reference surface, k is the conical coefficient, and A, B, C, E, . . . are the fourth, sixth, eighth, tenth, . . . aspherical coefficients.

From Eqs. (11) and (12), the pitch d of the diffraction type of optical element equivalent to the above-mentioned aspherical surface at a given ray height is represented by $$d = m\lambda / \{(n-1)\{ch/1 - c^2(k+1)h^2)^{1/2} + \qquad (13)$$
$$4Ah^3 + 6Bh^5 + 8Ch^7 + 10Dh^9 + \ldots \}\}$$

While up to the tenth aspherical coefficients are used in the examples given below, it is understood that the twelfth, fourteenth, . . . aspherical terms may be used.

Figure 5:
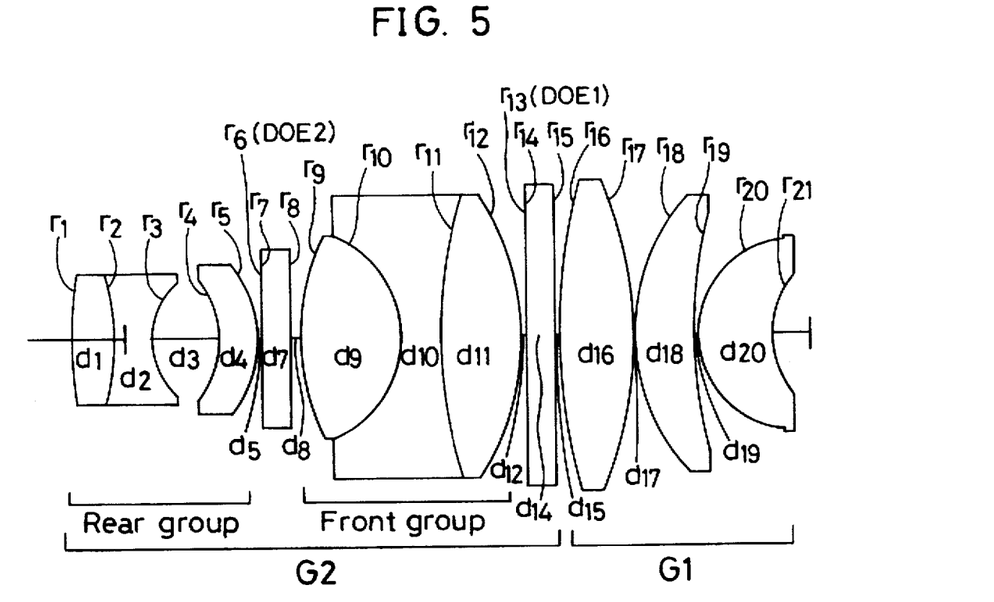
FIG. 5 is a sectional view of Example 1 of the objective of the present invention including the optical axis.

Then, the arrangement of each example of the present invention will now be explained. Referring to FIG. 5 or a sectional schematic of Example 1 including the optical axis, the second group G2 is made up of, in order from the image side, a doublet consisting of a double convex lens and a double concave lens, a negative meniscus lens concave on the image side, a plane-parallel plate having a second DOE on its image-side surface, a triplet consisting of a double convex lens, a double concave lens and a double convex lens, and a plane-parallel plate having a first DOE on its image-side surface, and the first lens group G1 is made up of a double convex lens, a positive meniscus lens convex on the image side, and a meniscus lens concave on the object side. The second group G2 is then divided into a rear sub-group consisting of the doublet and negative meniscus lens located on the image side of the plane-parallel plate having the second DOE and a front sub-group consisting of the triplet located on the object side of this plane-parallel plate. Thus, this example is directed to the type wherein the triplet is sandwiched between two DOEs. Set out below are main specifications of Example 1.

| Magnification | NA | Focal length | Parfocal length | Working distance | Maximum image height at sample surface |
| --- | --- | --- | --- | --- | --- |
| 50 | 0.9 | 3.6 mm | 45 mm | 1.5 mm | 0.22 mm |

Figure 6:
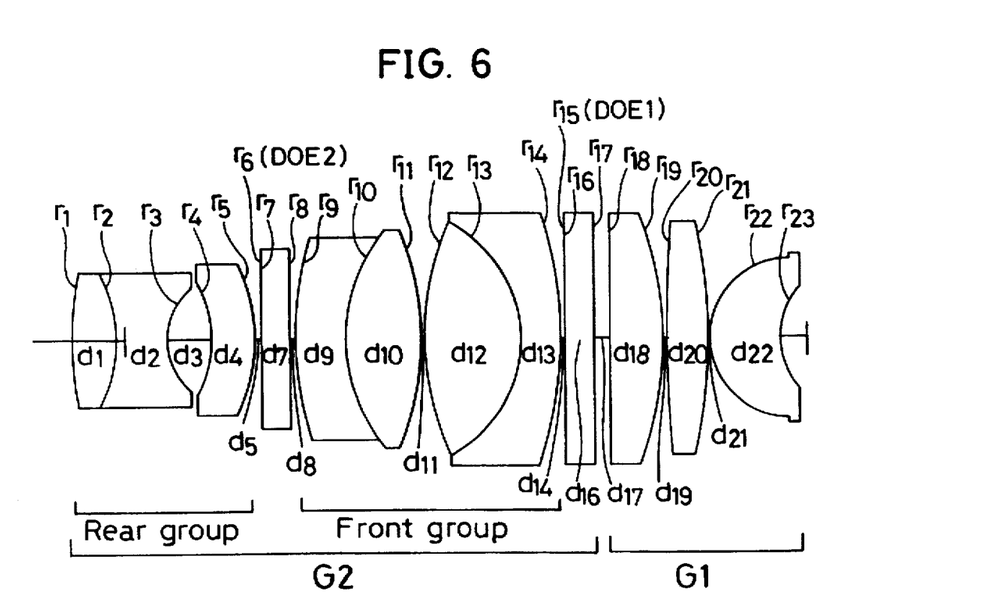
FIG. 6 is a sectional view of Example 2 of the objective of the present invention including the optical axis.

A sectional schematic of Example 2 including the optical axis is illustrated in FIG. 6. In this example the second group G2 is made up of, in order from the image side, a doublet consisting of a double convex lens and a double concave lens, a negative meniscus lens concave on the image side, a plane-parallel plate having a second DOE on its image-side surface, a doublet consisting of a negative meniscus lens convex on the image side and a double convex lens, a doublet consisting of a double convex lens and a negative meniscus lens convex on the object side, and a plane-parallel plate having a first DOE on its image-side surface, and the first lens group G1 is made up of a positive meniscus lens convex on the image side, a double convex lens, and a meniscus lens concave on the object side. The second group G2 is then divided into a rear sub-group consisting of the doublet and negative meniscus lens located on the image side of the plane-parallel plate having the second DOE and a front sub-group consisting of the two doublets located on the object side of this plane-parallel plate. Thus, this example is directed to the type wherein two doublets are sandwiched between two DOEs. Set out below are the main specifications of Example 2.

| Magnification | NA | Focal length | Parfocal length | Working distance | Maximum image height at sample surface |
| --- | --- | --- | --- | --- | --- |
| 50 | 0.9 | 3.6 mm | 45 mm | 1.0 mm | 0.22 mm |

Figure 7:
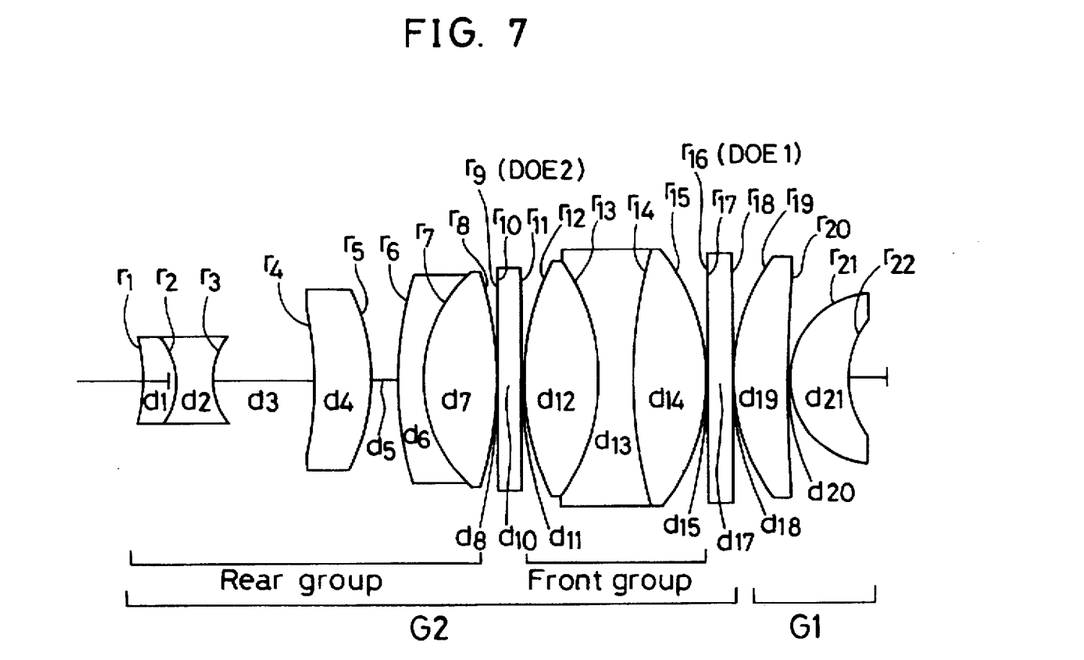
FIG. 7 is a sectional view of Example 3 of the objective of the present invention including the optical axis.

A sectional schematic of Example 3 including the optical axis is illustrated in FIG. 7. In this example, the second group G2 is made up of, in order from the image side, a doublet consisting of a positive meniscus lens concave on the image side and a double concave lens, a positive meniscus lens concave on the image side, a doublet consisting of a negative meniscus lens convex on the image side and a double convex lens, a plane-parallel plate having a second DOE on its image-side surface, a triplet consisting of a double convex lens, a double concave lens and a double convex lens, and a plane-parallel plate having a first DOE on its image-side surface, and the first group G1 is made up of a positive meniscus lens convex on the image side, and a positive meniscus lens concave on the object side. The second group G2 is then divided into a rear sub-group consisting of the doublet, positive meniscus lens and doublet located on the image side of the plane-parallel plate having the second DOE and a front sub-group consisting of the triplet located on the object side of this plane-parallel plate. Thus, this example is directed to the type wherein a triplet is sandwiched between two DOEs. Set out below are main specifications of Example 3.

| Magnification | NA | Focal length | Parfocal length | Working distance | Maximum image height at sample surface |
| --- | --- | --- | --- | --- | --- |
| 50 | 0.9 | 3.6 mm | 75 mm | 2.5 mm | 0.22 mm |

In all the examples, objectives corrected for chromatic aberrations over the range of λ=488 to 632.8 nm are achieved, with the exit pupil positions being all 8 mm away from the turret nose toward the object side.

In each example, the two DOEs are located in the order of the first DOE and the second DOE as viewed from the object side. In Examples 1 or 2, longitudinal chromatic aberration is mainly corrected by the first DOE while chromatic aberration of magnification is mainly corrected by the second DOE. In Example 3, longitudinal chromatic aberration is mainly corrected by both the first and second DOEs while chromatic aberration of magnification is mainly corrected by the lenses located on the image side of the second DOE.

Set out below are numerical data obtained by inverse ray-tracing concerning each example. Symbols used hereinafter but not hereinbefore mean:

$r_1, r_2, \ldots$ are the radii of curvature of the respective lens surfaces, $d_1, d_2, \ldots$ are the separations between the respective lens surfaces, $n_{d1}, n_{d2}, \ldots$ are the d-line indices of refraction of the respective lenses, and $v_{d1}, v_{d2}, \ldots$ are the Abbe's numbers of the respective lenses.

It is noted that $r_0$ and $d_0$ are the turret nose and the separation between the turret nose and the first lens surface, respectively, and the aspherical shape of the DOEs used is given by the above-mentioned Eq. (12).

EXAMPLE 1

| | | | |
| --- | --- | --- | --- |
| $r_0 = \infty$ | $d_0 = -3.44$ | | |
| $r_1 = 31.250$ | $d_1 = 2.67$ | $n_{d1} = 1.847$ | $v_{d1} = 23.8$ |
| $r_2 = -17.168$ | $d_2 = 2.51$ | $n_{d2} = 1.569$ | $v_{d2} = 63.2$ |
| $r_3 = 4.996$ | $d_3 = 4.34$ | | |
| $r_4 = -6.398$ | $d_4 = 2.50$ | $n_{d3} = 1.603$ | $v_{d3} = 60.7$ |
| $r_5 = -8.480$ | $d_5 = 0.20$ | | |
| $r_6 = -3.119 \times 10^{+6}$ (DOE2) | $d_6 = 0.00$ | $n_{d4} = 10001$ | $v_{d4} = -3.453$ |

-continued

| | | | |
|---|---|---|---|
| $r_7 = \infty$ | $d_7 = 2.00$ | $n_{d5} = 1.458$ | $v_{d5} = 67.7$ |
| $r_8 = \infty$ | $d_8 = 0.74$ | (Quartz) | |
| $r_9 = 14.834$ | $d_9 = 6.50$ | $n_{d6} = 1.498$ | $v_{d6} = 65.0$ |
| $r_{10} = -7.213$ | $d_{10} = 2.59$ | $n_{d7} = 1.847$ | $v_{d7} = 23.8$ |
| $r_{11} = 33.389$ | $d_{11} = 5.42$ | $n_{d8} = 1.697$ | $v_{d8} = 48.5$ |
| $r_{12} = -16.884$ | $d_{12} = 0.20$ | | |
| $r_{13} = 3.404 \times 10^{+6}$ (DOE1) | $d_{13} = 0.00$ | $n_{d9} = 10001$ | $v_{d9} = -3.453$ |
| $r_{14} = \infty$ | $d_{14} = 2.00$ | $n_{d10} = 1.458$ | $v_{d10} = 67.7$ |
| $r_{15} = \infty$ | $d_{15} = 0.26$ | (Quartz) | |
| $r_{16} = 42.704$ | $d_{16} = 4.76$ | $n_{d11} = 1.589$ | $v_{d11} = 61.2$ |
| $r_{17} = -26.929$ | $d_{17} = 0.20$ | | |
| $r_{18} = 14.056$ | $d_{18} = 3.96$ | $n_{d12} = 1.743$ | $v_{d12} = 49.3$ |
| $r_{19} = 34.223$ | $d_{19} = 0.20$ | | |
| $r_{20} = 6.187$ | $d_{20} = 4.90$ | $n_{d13} = 1.883$ | $v_{d13} = 40.8$ |
| $r_{21} = 6.131$ | | | |

Aspherical Coefficients

6th surface $k = -1.000000$
$A = -0.412025 \times 10^{-8}$
$B = 0.495427 \times 10^{-10}$
$C = -0.445012 \times 10^{-11}$
$D = 0.184938 \times 10^{-12}$ 13th surface $k = -1.000000$
$A = 0.185317 \times 10^{-10}$
$B = -0.302806 \times 10^{-11}$
$C = -0.404337 \times 10^{-14}$
$D = 0.128053 \times 10^{-15}$
R/t = 1.25, (W · H)/(L · f) = 0.029
DOE1: $D_d/D = 0.96$, (h · f)/(L · I) = 0.057, $f_d/f = 84.51$
DOE2: $D_d/D = 0.51$, (h · f)/(L · I) = 0.087

EXAMPLE 2

| | | | |
|---|---|---|---|
| $r_0 = \infty$ | $d_0 = -3.50$ | | |
| $r_1 = 22.514$ | $d_1 = 3.12$ | $n_{d1} = 1.847$ | $v_{d1} = 23.8$ |
| $r_2 = -10.066$ | $d_2 = 3.25$ | $n_{d2} = 1.762$ | $v_{d2} = 40.1$ |
| $r_3 = 4.998$ | $d_3 = 2.69$ | | |
| $r_4 = -8.431$ | $d_4 = 3.04$ | $n_{d3} = 1.835$ | $v_{d3} = 42.7$ |
| $r_5 = -11.143$ | $d_5 = 0.20$ | | |
| $r_6 = -3.202 \times 10^{+6}$ (DOE2) | $d_6 = 0.00$ | $n_{d4} = 10001$ | $v_{d4} = -3.453$ |
| $r_7 = \infty$ | $d_7 = 2.00$ | $n_{d5} = 1.458$ | $v_{d5} = 67.7$ |
| $r_8 = \infty$ | $d_8 = 0.20$ | (Quartz) | |
| $r_9 = 22.091$ | $d_9 = 3.53$ | $n_{d6} = 1.847$ | $v_{d6} = 23.8$ |
| $r_{10} = 12.192$ | $d_{10} = 4.85$ | $n_{d7} = 1.516$ | $v_{d7} = 64.2$ |
| $r_{11} = -18.354$ | $d_{11} = 0.20$ | | |
| $r_{12} = 19.647$ | $d_{12} = 6.55$ | $n_{d8} = 1.603$ | $v_{d8} = 60.7$ |
| $r_{13} = -8.768$ | $d_{13} = 2.50$ | $n_{d9} = 1.847$ | $v_{d9} = 23.8$ |
| $r_{14} = -25.550$ | $d_{14} = 0.20$ | | |
| $r_{15} = 2.679 \times 10^{+6}$ (DOE1) | $d_{15} = 0.00$ | $n_{d10} = 10001$ | $v_{d10} = -3.453$ |
| $r_{16} = \infty$ | $d_{16} = 2.00$ | $n_{d11} = 1.458$ | $v_{d11} = 67.7$ |
| $r_{17} = \infty$ | $d_{17} = 1.04$ | (Quartz) | |
| $r_{18} = -670.295$ | $d_{18} = 3.58$ | $n_{d12} = 1.603$ | $v_{d12} = 60.7$ |
| $r_{19} = -24.198$ | $d_{19} = 0.20$ | | |
| $r_{20} = 164.032$ | $d_{20} = 2.73$ | $n_{d13} = 1.883$ | $v_{d13} = 40.8$ |
| $r_{21} = -36.692$ | $d_{21} = 0.20$ | | |
| $r_{22} = 5.361$ | $d_{22} = 4.84$ | $n_{d14} = 1.883$ | $v_{d14} = 40.8$ |
| $r_{23} = 5.593$ | | | |

Aspherical Coefficients

6th surface $k = -1.000000$
$A = -0.132845 \times 10^{-8}$
$B = 0.819433 \times 10^{-10}$
$C = -0.335679 \times 10^{-11}$
$D = 0.111735 \times 10^{-12}$ 15th surface $k = -1.000000$
$A = -0.996604 \times 10^{-9}$
$B = -0.763516 \times 10^{-11}$
$C = 0.175102 \times 10^{-12}$
$D = -0.474485 \times 10^{-15}$
R/t = 1.15, (W · H)/(L · f) = 0.013
DOE1: $D_d/D = 0.99$, (h · f)/(L · I) = 0.044, $f_d/f = 66.51$
DOE2: $D_d/D = 0.65$, (h · f)/(L · I) = 0.102

EXAMPLE 3

| | | | |
|---|---|---|---|
| $r_0 = \infty$ | $d_0 = -2.64$ | | |
| $r_1 = -21.162$ | $d_1 = 3.62$ | $n_{d1} = 1.805$ | $v_{d1} = 25.4$ |
| $r_2 = -7.242$ | $d_2 = 3.71$ | $n_{d2} = 1.615$ | $v_{d2} = 51.2$ |
| $r_3 = 7.560$ | $d_3 = 10.40$ | | |
| $r_4 = -38.094$ | $d_4 = 6.00$ | $n_{d3} = 1.757$ | $v_{d3} = 47.8$ |
| $r_5 = -22.020$ | $d_5 = 2.47$ | | |
| $r_6 = 32.244$ | $d_6 = 2.97$ | $n_{d4} = 1.834$ | $v_{d4} = 37.2$ |
| $r_7 = 15.339$ | $d_7 = 7.51$ | $n_{d5} = 1.487$ | $v_{d5} = 70.2$ |
| $r_8 = -41.615$ | $d_8 = 0.20$ | | |
| $r_9 = -5.099 \times 10^{+6}$ (DOE2) | $d_9 = 0.00$ | $n_{d6} = 10001$ | $v_{d6} = -3.453$ |
| $r_{10} = \infty$ | $d_{10} = 2.50$ | $n_{d7} = 1.516$ | $v_{d7} = 64.2$ |
| $r_{11} = \infty$ | $d_{11} = 0.20$ | | |
| $r_{12} = 29.202$ | $d_{12} = 8.24$ | $n_{d8} = 1.487$ | $v_{d8} = 70.2$ |
| $r_{13} = -20.341$ | $d_{13} = 2.97$ | $n_{d9} = 1.785$ | $v_{d9} = 25.7$ |
| $r_{14} = 46.725$ | $d_{14} = 7.86$ | $n_{d10} = 1.487$ | $v_{d10} = 70.2$ |
| $r_{15} = -22.537$ | $d_{15} = 0.20$ | | |
| $r_{16} = 3.101 \times 10^{+6}$ (DOE1) | $d_{16} = 0.00$ | $n_{d11} = 10001$ | $v_{d11} = -3.453$ |
| $r_{17} = \infty$ | $d_{17} = 2.50$ | $n_{d12} = 1.516$ | $v_{d12} = 64.2$ |
| $r_{18} = \infty$ | $d_{18} = 0.20$ | | |
| $r_{19} = 22.726$ | $d_{19} = 5.72$ | $n_{d13} = 1.800$ | $v_{d13} = 42.2$ |
| $r_{20} = 277.621$ | $d_{20} = 0.20$ | | |
| $r_{21} = 8.934$ | $d_{21} = 6.38$ | $n_{d14} = 1.835$ | $v_{d14} = 42.7$ |
| $r_{22} = 11.189$ | | | |

Aspherical Coefficients

9th surface $k = -1.000000$
$A = -0.415606 \times 10^{-9}$
$B = 0.261911 \times 10^{-12}$
$C = -0.765416 \times 10^{-14}$
$D = 0.410329 \times 10^{-16}$ 16th surface $k = -1.000000$
$A = 0.513728 \times 10^{-10}$
$B = -0.806226 \times 10^{-12}$
$C = 0.391273 \times 10^{-14}$
$D = -0.867593 \times 10^{-17}$
R/t = 1.75, (W · H)/(L · f) = 0.048
DOE1: $D_d/D = 0.98$, (h · f)/(L · I) = 0.046, $f_d/f = 86.13$
DOE2: $D_d/D = 0.85$, (h · f)/(L · I) = 0.024

Figures 8A, 8B:
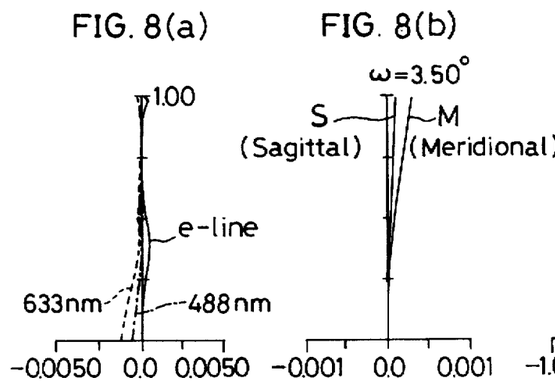
FIGS. 8(a)–8(d) are inverse ray-tracing aberration diagrams of Example 1 with (a), (b), (c) and (d) representing spherical aberration, astigmatism, distortion and coma, respectively.
Figure 8C:
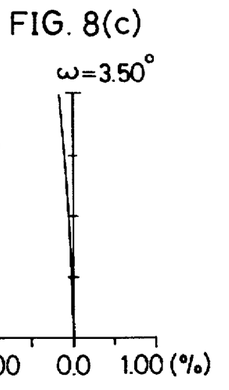
Figure 8D:
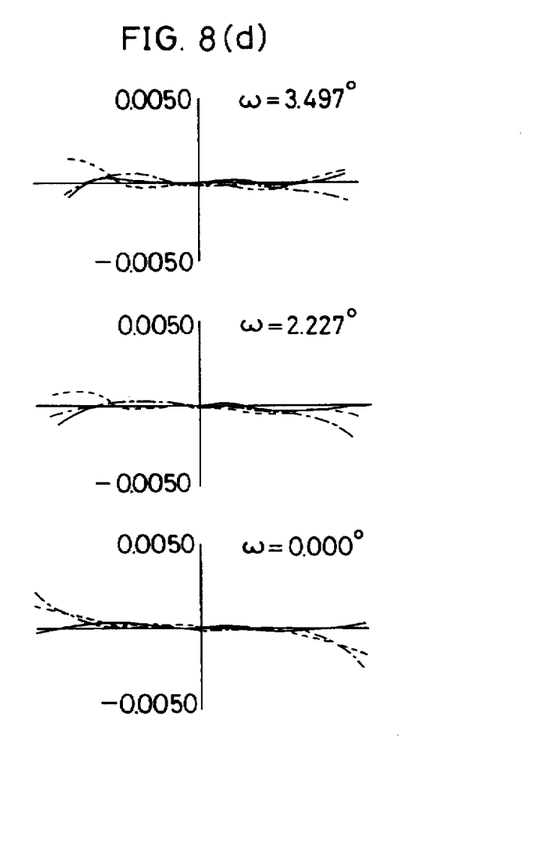
Figure 9A:
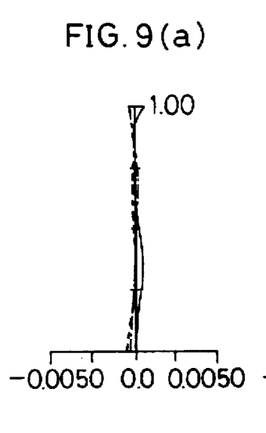
FIGS. 9(a)–9(d) are aberration diagrams of Example 2 similar to FIGS. 8(a)–8(d) and FIGS. 10(a)–10(d) are aberrations diagrams of Example 3 similar to FIGS. 8(a)–8(d).
Figure 9B:
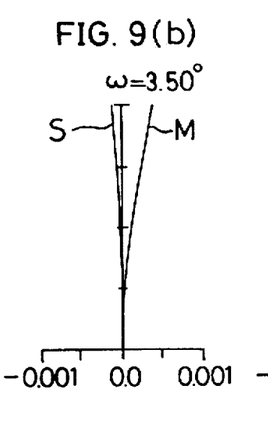
Figure 9C:
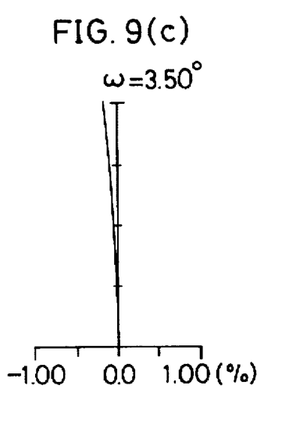
Figure 9D:
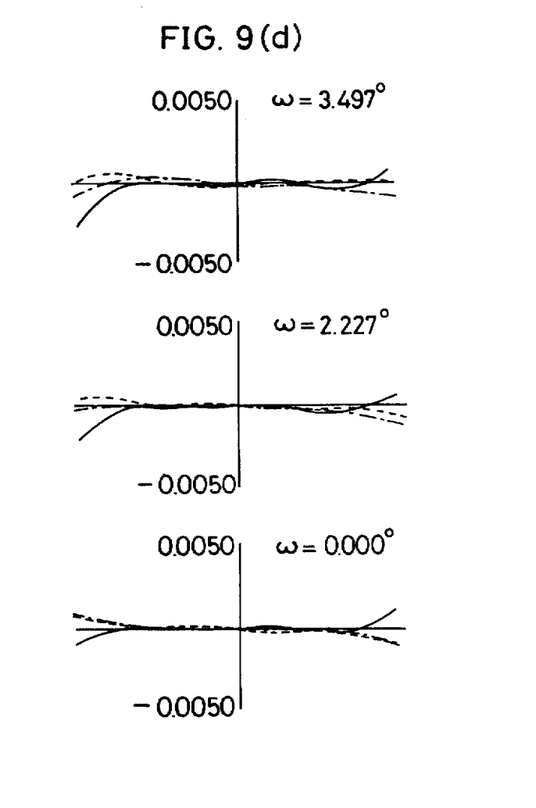
Figure 10A:
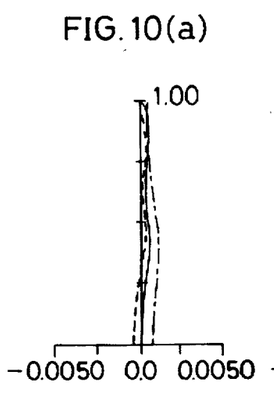
Figure 10B:
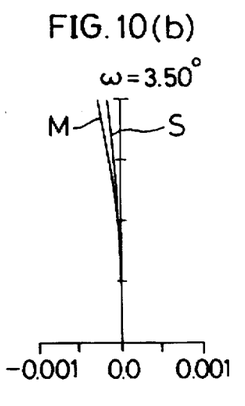
Figure 10C:
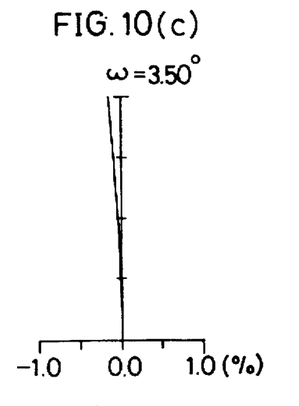
Figure 10D:
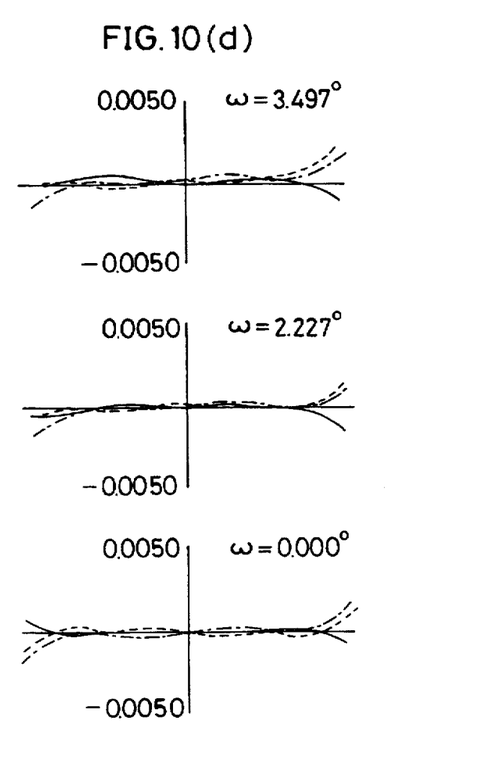

The inverse ray-tracing aberration diagrams of Example 1 are shown in FIG. 8 with (a), (b), (c) and (d) representing spherical aberration, astigmatism, distortion and coma, respectively. Similar aberration diagrams of Examples 2 and 3 are shown in FIGS. 9 and 10. In these diagrams, ω stands for the half field angle.

As can be appreciated from the foregoing, the present invention successfully provides high-magnification and high-NA objectives having a long working distance, which are well corrected for various aberrations, especially chromatic aberrations over a wide wavelength range, and are uniform in terms of exit pupil position as well.

What we claim is:

1. An objective system comprising:

a first diffraction type of optical element having a diffraction action;

a second diffraction type of optical element located at an image side of said first diffraction type of optical element; and at least one cemented lens having a cemented surface, wherein said at least one cemented lens is located between said first and second diffraction type of optical elements.

2. An objective system according to claim 1, further comprising a meniscus lens located at an object side of said first diffraction type of optical element, wherein said meniscus lens is concave on said object side.

3. An objective system according to claim 1, further comprising a lens group having a positive power wherein said lens group includes a meniscus lens located at an object side of said first diffraction type of optical element, wherein said meniscus lens is concave on said object side.

4. An objective system comprising, in order from an object side:
   a first lens group including a meniscus lens concave on the object side, said first lens group having a positive power as a whole;
   a first diffraction type of optical element having a diffraction action; and
   a second lens group divided into a front sub-group including at least one cemented lens having a cemented surface and a rear sub-group having at least one lens, wherein a second diffraction type of optical element is located between said front sub-group and said rear sub-group.

5. An objective system according to claim 1, 2, 3 or 4, wherein at least one of said first and second diffraction type of optical elements is in the form of a transparent member having a diffraction surface of sawtooth shape in section.

6. An objective system according to claim 1, 2, 3 or 4, wherein at last one of said first and second diffraction type of optical elements is in the form of a transparent member having a diffraction surface of stepped sawtooth shape in section.

7. An objective system according to claim 2, 3, or 4 which further satisfies the following condition:

$$0.5 < R/t < 5$$

where R is the radius of curvature of said meniscus lens on the image side, and t is the thickness of said meniscus lens.

8. An objective system according to claim 1, 2, 3 or 4, wherein, at least one of said first and said second diffractive type optical elements satisfies the following condition:

$$D_d/D > 0.8$$

where $D_d$ is a diameter of a bundle of marginal rays at a surface of the corresponding diffraction type of optical element and D is a maximum height of marginal rays through said objective system.

9. An objective system according to claim 1, 2, 3 or 4, wherein, at least one of said first and said second diffractive type optical elements satisfies the following condition:

$$(h \cdot f)/(L \cdot I) > 0.07$$

where f is the focal length of the objective system, h is a maximum ray height at a surface of the corresponding diffraction type of optical element, L is the parfocal length, and I is the maximum image height at a sample surface.

10. An objective system according to claim 2, 3, or 4, which further satisfies the following condition:

$$(W \cdot H)/(L \cdot f) > 0.005$$

where W is the working distance, L is the parfocal length, H is a marginal ray height at said concave surface of said meniscus lens, and f is a focal length of the objective system.

11. An objective system according to claim 1, 2, 3 or 4, wherein one of said first and second diffraction type of optical elements has a positive power and the other has a negative power.

12. An objective system according to claim 11, which further satisfies the following condition:

$$30 < f_d/f < 150$$

where f and $f_d$ are the focal lengths of the objective system and said diffraction type of optical element having a positive power, respectively.

13. An objective system according to claim 1, 2, 3 or 4, wherein an Abbe's number difference Δv between adjacent lenses of said at least one cemented lens is given by the following condition:

$$\Delta v > 20.$$

14. An objective system according to claim 1, 2, 3 or 4, wherein at least one positive surface and at least one negative surface are located at an image side of an actual pupil position, said actual pupil being located at a position at which an off-axis principal ray intersects an optical axis.

15. An objective system according to claim 1, 2, 3 or 4, further comprising a cemented lens group, wherein said cemented lens group comprises a cemented lens located at a position nearer to said image side than a position of said second diffraction type of optical element and on a side of said objective system nearest to said image side.

* * * * *